(12) United States Patent
Shapiro

(10) Patent No.: US 8,353,159 B2
(45) Date of Patent: Jan. 15, 2013

(54) COMBUSTION ENGINE WITH HEAT RECOVERY SYSTEM

(76) Inventor: Robert L. Shapiro, Andover, MA (US)

( * ) Notice: Subject to any disclaimer, the term of this patent is extended or adjusted under 35 U.S.C. 154(b) by 648 days.

(21) Appl. No.: 12/436,385

(22) Filed: May 6, 2009

(65) Prior Publication Data

US 2010/0282224 A1 Nov. 11, 2010

(51) Int. Cl.
*F02G 3/00* (2006.01)
*F02B 25/00* (2006.01)
*F02B 25/14* (2006.01)
*F02B 75/00* (2006.01)
*F02B 33/22* (2006.01)
*F02B 41/06* (2006.01)

(52) U.S. Cl. .................. 60/614; 123/70 R; 123/61 R

(58) Field of Classification Search ............. 123/61 R, 123/70 R; 60/614, 617, 618, 320
See application file for complete search history.

(56) References Cited

U.S. PATENT DOCUMENTS

| | | | |
|---|---|---|---|
| 4,057,040 A | 11/1977 | Wax | |
| 4,120,157 A | 10/1978 | Tang | |
| 4,266,404 A | 5/1981 | ElDifrawi | |
| 4,489,596 A * | 12/1984 | Linder et al. | 73/114.19 |
| 4,910,969 A | 3/1990 | Dalin et al. | |
| 4,913,098 A | 4/1990 | Battaglini | |
| 6,543,225 B2 | 4/2003 | Scuderi | |
| 6,609,371 B2 | 8/2003 | Scuderi | |
| 6,722,127 B2 | 4/2004 | Scuderi | |
| 6,880,502 B2 | 4/2005 | Scuderi | |
| 6,952,923 B2 | 10/2005 | Branyon et al. | |
| 6,986,329 B2 | 1/2006 | Scuderi et al. | |
| 7,017,536 B2 | 3/2006 | Scuderi | |
| 7,219,630 B2 * | 5/2007 | Patton | 123/25 C |
| 7,481,189 B2 * | 1/2009 | Zajac | 123/70 R |
| 7,487,748 B2 * | 2/2009 | Zajac | 123/70 R |
| 7,905,221 B2 * | 3/2011 | Salminen | 123/663 |
| 7,997,080 B2 * | 8/2011 | Harmon et al. | 60/670 |
| 2003/0014971 A1 * | 1/2003 | Scuderi | 60/597 |
| 2005/0139178 A1 * | 6/2005 | Scuderi | 123/70 R |
| 2006/0137631 A1 * | 6/2006 | Patton | 123/70 R |
| 2006/0180104 A1 * | 8/2006 | Springer | 123/70 R |
| 2006/0243229 A1 * | 11/2006 | Zajac | 123/70 R |
| 2007/0157894 A1 * | 7/2007 | Scuderi et al. | 123/70 R |
| 2008/0105225 A1 * | 5/2008 | Scuderi et al. | 123/70 R |
| 2008/0115775 A1 * | 5/2008 | Antonov et al. | 123/70 R |
| 2008/0276615 A1 * | 11/2008 | Bennett | 60/614 |
| 2009/0266347 A1 * | 10/2009 | Scuderi et al. | 123/70 R |

* cited by examiner

*Primary Examiner* — Thomas Denion
*Assistant Examiner* — Cameron Setayesh

(57) ABSTRACT

An internal combustion engine has at least two double action internal combustion cylinders and a separate double action compressor cylinder. Each double action internal combustion cylinder has a multi-point ignition system for each combustion chamber for causing multiple flame fronts to cause the fuel/air mixture to burn more quickly. Furthermore, the engine has a closed heat recovery system that takes heat from the exhaust of the internal combustion cylinder system and delivers power to a crankshaft. Accordingly, the internal combustion engine has increased efficiency by minimizing friction and extracting energy from multiple sources.

20 Claims, 11 Drawing Sheets

COMBUSTION ENGINE WITH HEAT RECOVERY SYSTEM

TECHNICAL FIELD

The present invention relates to a combustion engine and more particularly, to an engine with various improvements to improve efficiency.

BACKGROUND INFORMATION

As fossil fuel resources and the related environment issues, in particular air quality, become more important to the public, as evidenced by the increased discussion in the popular press, there is an increased desire by the public to obtain vehicles with increased efficiency. Therefore manufacturers are looking for apparatus and methods to increase the efficiency of the internal combustion engine or replace the internal combustion engine. One technique to improve efficiency is through hybrid vehicles whose wheels are driven by a combination of an internal combustion engine and an electric motor. However there are concerns that the increased efficiencies are being off-set by the potential solid waste of the battery. In addition, hybrid vehicles are designed to promote efficiency during around-town driving in that they convert energy normally wasted during coasting and braking into electricity.

Unfortunately, there are deficiencies in conventional internal combustion engines that lead to inefficiencies. Furthermore, hybrid vehicles do not overcome these deficiencies. Furthermore, the internal combustion engine discharges a significant waste heat product that is dumped into the environment.

SUMMARY

In contrast to the above-described internal combustion engine, the engine as described below has several features that increase efficiency. One feature is to have a double action compression cylinder for air intake and compression and a double action combustion cylinder for combustion and exhaust. Another feature is to have a multi-point ignition system for each of the combustion cylinders. In addition, the engine has a heat recovery system that uses a heat transfer fluid to extract heat from the exhaust of the internal combustion engine. The energy in the heat transfer fluid drives at least one double action steam-powered cylinder. The heat transfer fluid is in a closed system. Furthermore, the increased efficiency allows for a smaller engine having less weight and therefore allowing for increased useable weight in the vehicle.

One embodiment is an internal combustion engine having a compressor cylinder, a compressed air reservoir, and at least two internal combustion cylinders. The compressor cylinder has a cylinder for receiving a piston with a rod. The cylinder has a cylinder head and a side wall. The cylinder has an air intake for receiving air and an exhaust valve on the cylinder head. The piston is movable within the cylinder and has a face therein defining a compression chamber.

The compressed air reservoir is connected to the compressor cylinder for receiving and storing the compressed air. Each internal combustion cylinder has a cylinder for receiving a piston with a rod. The cylinder has a cylinder head and a side wall. Each internal combustion cylinder has an air intake for receiving air from the compressed air reservoir and an exhaust valve on the cylinder head. The piston is movable within the cylinder and has a face therein defining a combustion chamber.

The internal combustion engine has a crankshaft. The rod of the piston of the internal combustion cylinder is connected to the crankshaft for rotating the shaft. The rod of the piston of the compressor cylinder is connected to the shaft and is driven by the rotation of the shaft.

The engine has a fuel injection mechanism for injecting fuel into the combustion chamber. An ignition system is used for igniting a mixture of compressed air and fuel in the combustion chamber to drive the piston. The engine has the air compressed prior to being injected into the combustion chamber therein allowing a sole compression cylinder to provide compressed air to at least two internal combustion cylinders therefore reducing frictional energy losses.

In an embodiment of the internal combustion engine, the compressor cylinder and the at least two combustion cylinders are each double action with the cylinder having a pair of cylinder heads and a side wall. The piston is movable within the cylinder and has a pair of faces therein defining a pair of chambers in each cylinder. The piston in each cylinder has a rod that extends through one of the cylinder heads of the cylinder.

In an embodiment, the internal combustion engine has a closed heat recovery system. The closed heat recovery system has a heat exchanger for taking heat of the exhaust from the at least one internal combustion cylinder and transferring a portion of the heat to a heat transfer fluid. The closed heat recovery system has a first double action power cylinder having a cylinder for receiving a piston. The cylinder has a pair of cylinder heads and a side wall. The piston is movable within the cylinder and has a pair of faces therein defining a pair of chambers. The piston is driven by the expansion of the heat transfer fluid in one of the chambers. The piston is connected to a rod that extends out of the cylinder.

The closed heat recovery system has a second double action power cylinder having a cylinder for receiving a piston. The cylinder has a pair of cylinder heads and a side wall. The piston is movable within the cylinder and has a pair of faces therein defining a pair of chambers. The piston is driven by the expansion of the heat transfer fluid in one of the chambers, the piston connected to a rod that extends out of the cylinder.

A condenser of the closed heat recovery system is connected to the exhaust of the second double action power cylinder for converting the heat transfer fluid into a liquid. A pump receives the output of the condenser and pumps the heat transfer fluid to the heat exchanger and increases the pressure of the heat transfer liquid. The rod of the piston from each of the double action power cylinders is connected to a steam power crankshaft and rotates the steam power crankshaft. A step down gear connects the steam power crankshaft to the crankshaft for delivering power to the crankshaft.

In one embodiment, the heat transfer liquid has a boiling temperature at atmospheric pressures in the range of 120° F. to 180° F. such as methanol.

In an embodiment, the cylinder head through which the rod extends has an opening with a plurality of grooves. A plurality of clamp rings are carried in the grooves on the cylinder head for sealing the opening while allowing motion of the rod relative to the cylinder head. A cross head bearing mechanism converts lateral motion of the piston rod to translational motion of the crankshaft.

In an embodiment, the ignition system of the internal combustion engine has a multiple spark device associated with each of the cylinder heads of the internal combustion cylinder. Each multiple spark device has a post extending from the cylinder head and a post extending from the face of the piston. A plurality of electrodes defined by a plurality of lead wires and intervening gaps are carried on a face of an insulated surface on the face of the piston. The multiple sparks are formed between adjacent lead wires and between the posts when the piston is in proximity to the respective cylinder head.

In accordance with another aspect of the invention, the internal combustion engine has a double action compressor cylinder, a compressed air reservoir, at least two double action internal combustion cylinders, a fuel injection mechanism, an ignition system, and a closed heat recovery system. The double action compressor cylinder has a cylinder for receiving a piston. The cylinder has a pair of cylinder heads and a side wall, an air intake for receiving air, and an exhaust valve on each of the cylinder heads. The piston is movable within the cylinder and has a pair of faces therein defining a pair of compression chambers. The piston has a rod that extends through one of the cylinder heads of the double action compressor cylinder.

The compressed air reservoir is connected to the compressor cylinder for receiving and storing the compressed air. The at least two double action internal combustion cylinders each have a cylinder for receiving a piston. The cylinder has a pair of cylinder heads and a side wall, an air intake for receiving air from the compressed air reservoir, and an exhaust valve on each of the cylinder heads. The piston is movable within the cylinder and has a pair of faces therein defining a pair of combustion chambers. The piston has a rod that extends through one of the cylinder heads of the double action internal combustion cylinder.

The rod of the piston of the internal combustion cylinder is connected to a crankshaft and rotates the shaft. The rod of the piston from the compressor cylinder is connected to the shaft and is driven by the rotation of the shaft. A cross head bearing mechanism converts lateral motion of the piston rod to translational motion of the crankshaft.

The fuel injection mechanism injects fuel into the combustion chamber. The ignition system is for igniting a mixture of compressed air and fuel in the combustion chamber to drive the piston.

In an embodiment, the pressure of the exhaust from the double action combustion cylinder is greater than 50,000 atmospheres.

In an embodiment, the internal combustion engine has a double action compressor cylinder, a compressed air reservoir, at least two double action internal combustion cylinders, at least a pair of double action expansion cylinders, and a heat recovery system.

The double action compressor cylinder has a cylinder for receiving a piston. The cylinder has a pair of cylinder heads and a side wall. The cylinder has an air intake for receiving air and an exhaust valve on each of the cylinder heads. The piston is movable within the cylinder and has a pair of faces therein defining a pair of compression chambers. The piston has a rod that extends through one of the cylinder heads of the double action compressor cylinder.

The compressed air reservoir is connected to the compressor cylinder for receiving and storing the compressed air. The double action internal combustion cylinders each have a cylinder for receiving a piston. The cylinder has a pair of cylinder heads and a side wall. The cylinder has an air intake for receiving air from the compressed air reservoir and an exhaust valve on each of the cylinder heads. The piston is movable within the cylinder and has a pair of faces therein defining a pair of combustion chambers. The piston has a rod that extends through one of the cylinder heads of the double action internal combustion cylinder.

The pair of double action expansion cylinders each has a cylinder for receiving a piston. Each of the cylinders has a pair of cylinder heads and a side wall. The piston is movable within the cylinder and has a pair of faces therein defining a pair of chambers. The first double action expansion cylinder has a pair of intakes for receiving exhaust from the at least two internal combustion cylinders and a pair of outputs for exporting exhaust to the second double action cylinder. The piston is driven by the expansion of the exhaust in the cylinder. The piston has a rod that extends out of the cylinder for driving the crank shaft. The second double action expansion cylinder has a pair of intakes for receiving exhaust from the first double action expansion cylinder and a pair of outputs for exporting exhaust to a heat exchanger. The piston is driven by the expansion of the exhaust in the cylinder. The piston has a rod that extends out of the cylinder for driving the crank shaft.

The internal combustion engine has a crankshaft. The rod of the piston of the internal combustion cylinder is connected to the crankshaft for rotating the crankshaft. The rod of the piston from each of the expansion cylinders is connected to the crankshaft and rotates the crank shaft. The rod of the piston from the compressor cylinder is connected to the shaft and is driven by the rotation of the shaft. A cross head bearing mechanism converts lateral motion of the piston rod to translational motion of the crankshaft.

A fuel injection mechanism injects fuel into the combustion chamber. An ignition system ignites a mixture of compressed air and fuel in the combustion chamber to drive the piston.

The closed heat recovery system includes a heat exchanger for taking heat of the exhaust from the at least one internal combustion cylinder and transferring a portion of the heat to a heat transfer fluid. The heat exchanger includes piping for interacting with the internal combustion cylinder and the compressed air reservoir for extracting heat from the internal combustion cylinder and conditioning the compressed air in the compressed air reservoir.

The air is compressed prior to being injected into the combustion chamber. This allows a sole compression cylinder to provide compressed air to at least two internal combustion cylinders therefore reducing frictional energy loss.

These aspects of the invention are not meant to be exclusive and other features, aspects, and advantages of the present invention will be readily apparent to those of ordinary skill in the art when read in conjunction with the following description, appended claims and accompanying drawings.

BRIEF DESCRIPTION OF THE DRAWINGS

The foregoing and other objects, features, and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENTS

An internal combustion engine has at least two double action internal combustion cylinders and a separate double action compressor cylinder. Each double action internal combustion cylinder has a multi-point ignition system for each combustion chamber for causing multiple flame fronts to cause the fuel/air mixture to burn more quickly. Furthermore, the engine has a closed heat recovery system that takes heat from the exhaust of the internal combustion cylinder system and delivers power to a crankshaft. Accordingly, the internal combustion engine has increased efficiency by minimizing friction and extracting energy from multiple sources.

Figure 1:
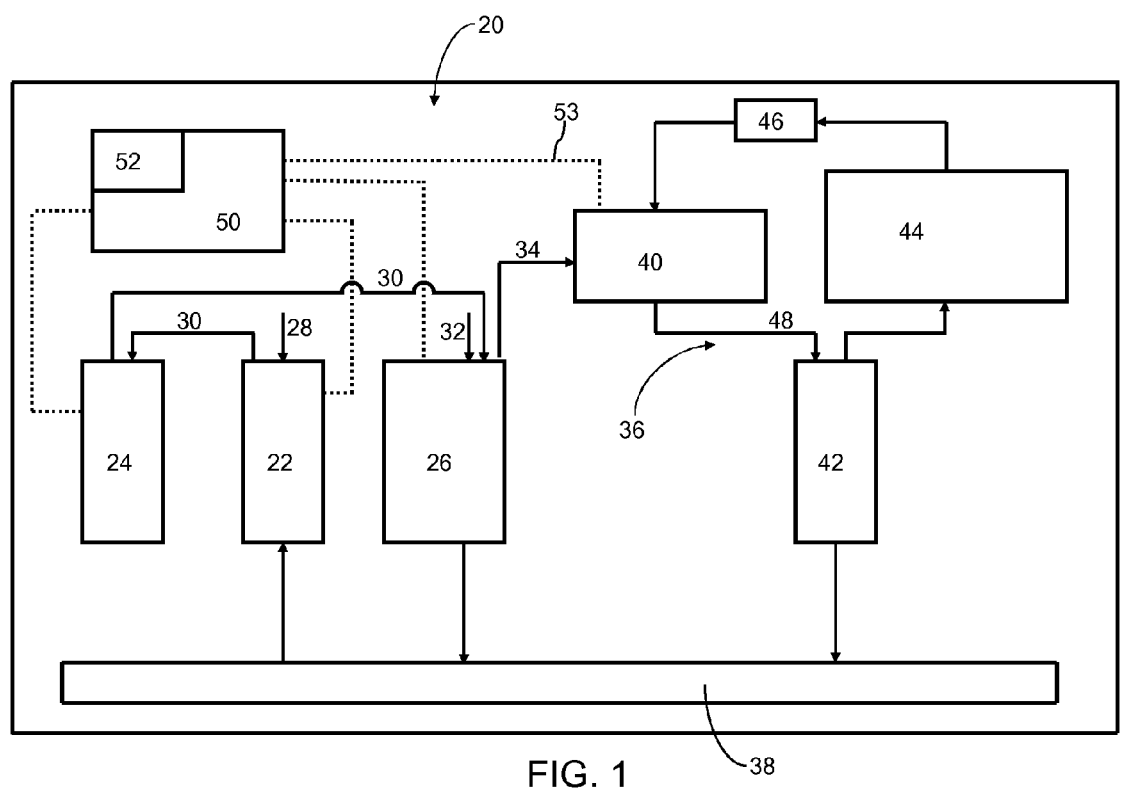
FIG. 1 is a schematic of an internal combustion engine of the present invention.

Referring to FIG. 1, a schematic of an internal combustion engine 20 is shown. The internal combustion engine 20 has a series of components including a double action compression cylinder 22, a compressed air reservoir 24, and a double action internal combustion cylinder 26. Air 28 is taken into the double action compression cylinder 22 and compressed. The compressed air 30 is stored in the compressed air reservoir 24 until needed. The compressed air 30 is mixed with fuel 32 in the double action combustion cylinder 26 and is ignited as explained in further detail below with respect to FIG. 3. The exhaust 34 from the double action combustion cylinder 26 is sent to a heat recovery system 36. The motion of the piston in the double action combustion cylinder 26 drives a crankshaft 38. The crankshaft 38, in addition to other things, drives the piston in the double action compressor cylinder 22 as explained below in more detail.

At startup of the engine 20, the compressed air reservoir 24 will be "empty" at 1 atmosphere pressure. There is a battery powered starter motor which turns the engine over, and drives the compressor, for several revolutions. This initial motion of the compression cylinder 22 will raise the pressure in the reservoir 24 quickly to approximately 40 atmosphere pressure after approximately a dozen revolutions. Steady state air compression in the reservoir of 100 atmosphere pressure occurs after a couple hundred revolutions. The reservoir will supply 100 atmosphere pressure compressed air to the combustion cylinders 26. (This 100 atmosphere pressure is compared to 8-12 atmosphere pressure for gasoline engines and 25 atmosphere pressure for diesel engines).

Still referring to FIG. 1, the heat recovery system 36 of the internal combustion engine 20 includes a heat exchanger 40, a double action steam-powered cylinder 42, a condenser 44, and a pump 46. The boiler or heat exchanger 40 transfers the heat from the exhaust 34 to a heat transfer fluid 48. The heat transfer fluid 48 in the form of a high pressure gas is sent to the double action steam-powered cylinder 42 to drive the piston and thereby drive the crankshaft 38. From the double action steam-powered cylinder 42, the heat transfer fluid 48 is condensed into a liquid in the condenser 44 and pressure is increased by the pump 46, as explained in further detail below.

The internal combustion engine 20 has a control system 50 that controls the operation of the engine 20. The control system 50 has a controller 52, such as a computer or microprocessor, that controls the valve systems, the ignition, and monitors temperatures and pressures. It is recognized that the control system 50 could monitor fuel ratios, spark timing, temperatures and compression (pressure), and other properties (elements) of the internal combustion engine 20. The series of hidden lines 53 from the control system 50 represent control lines.

Figure 2:
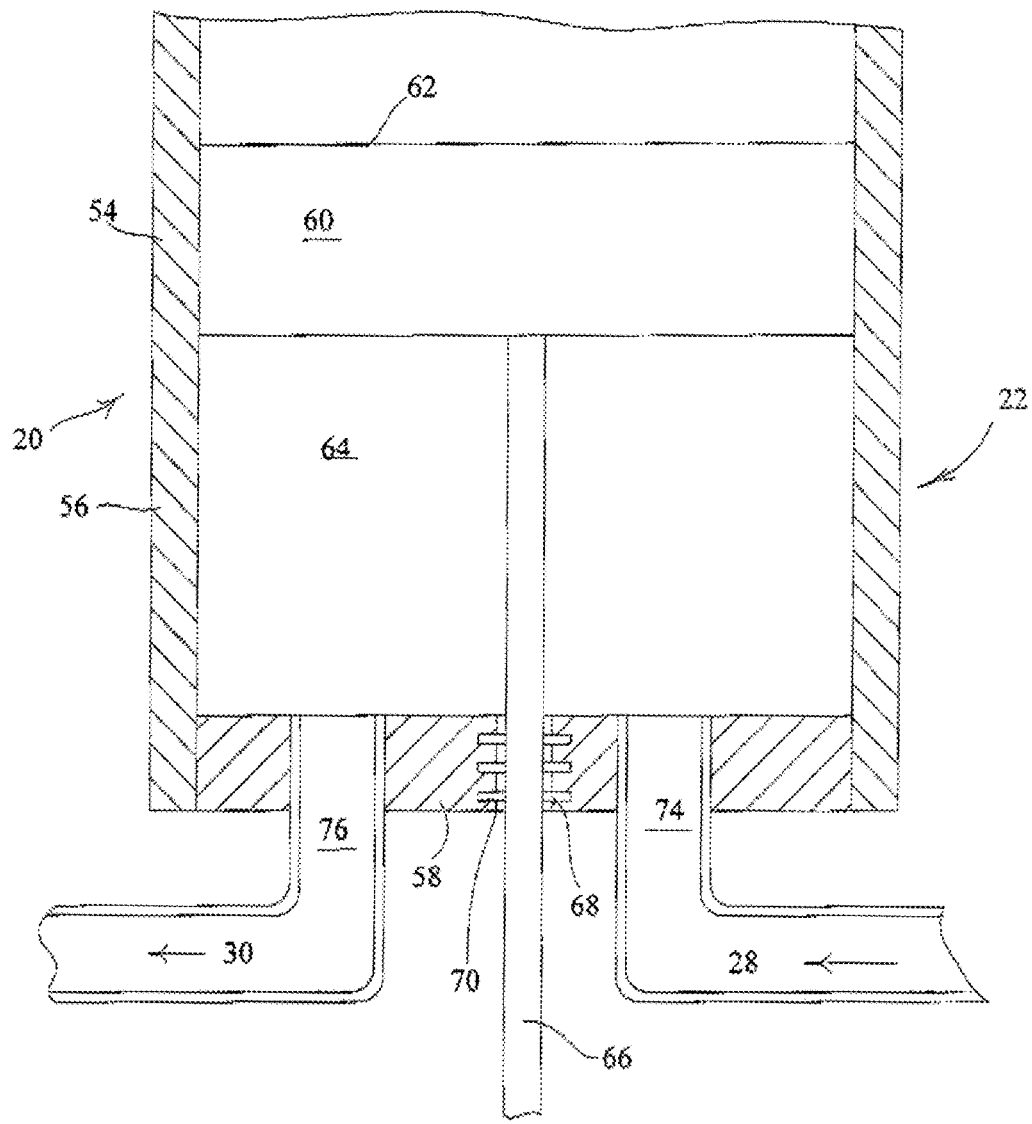
FIG. 2 is a sectional view of a half of a double action compressor of the internal combustion engine.

Referring to FIG. 2, a section of half of the double action compressor cylinder 22 is shown. The double action compression cylinder 22 has a cylinder 54 with a wall 56. At each end of the cylindrical wall 56 is a cylinder head 58, only one is shown. The double action compression cylinder 22 has a piston 60 which moves up and down in the cylinder 54. The piston 60 has a pair of piston faces 62. The piston faces 62 define the boundary of variable size chambers 64. In the portion of the double action compression cylinder 22 as shown, a piston rod 66 extends from the piston 60 through the cylinder head 58. The piston rod 66 is connected to the crankshaft 38 as seen in FIG. 1 and described in further detail below. In that the piston rod 66 extends through one of the chambers 64 of the double action compressor cylinder 22, the hole in the cylinder head 58 through which the piston rod 66 extends needs to be sealed to prevent the compressed air 30 from escaping. The double action compressed cylinder 22 has a plurality of clamp rings 68. The clamp rings 68 are positioned in a plurality of grooves 70 located in the cylinder head 58. The clamp rings 68 prevent the compressed gas 30 from escaping from the chamber 64. Each of the two chambers 64 of the dual action compressor cylinder 22 has at least one intake port 74 for the air 28 and at least one exhaust port 76 for the compressed air 30.

The ports are opened and closed through a valve system as described below with respect to FIGS. 4A & 4B. The valve can be driven mechanically by a cam shaft, pneumatically, or electrically. In a preferred embodiment, the valves are driven electrically and controlled by the controller 52 shown in FIG. 1.

Figure 3:
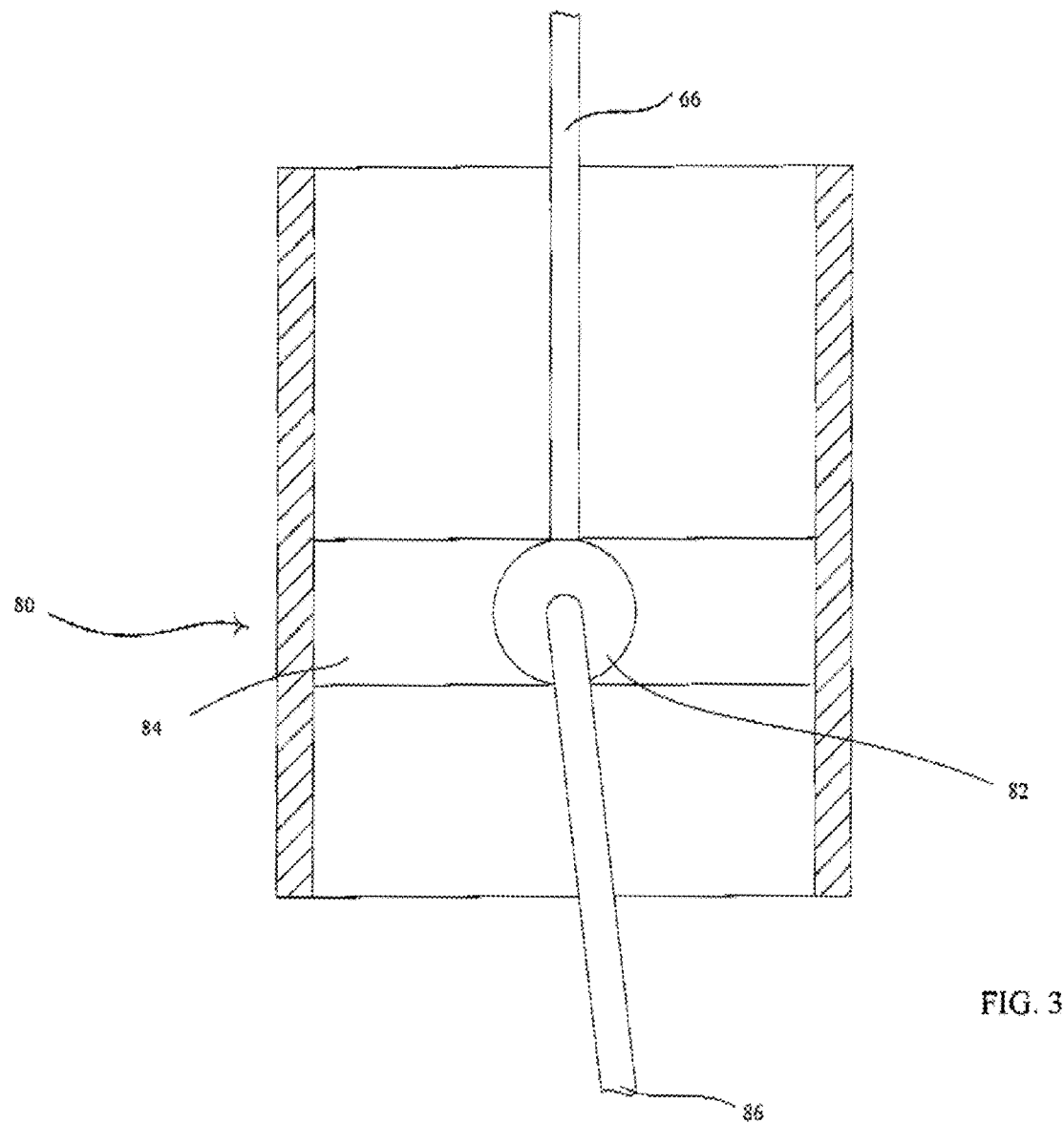
FIG. 3 is a sectional view of the crosshead bearing mechanism.

Referring to FIG. 3, a sectional view of a cross-head bearing mechanism 80 is shown. The internal combustion engine 20 uses a plurality of double action cylinders as discussed in brief above and in more detail below. In that the cylinders are double action, the respective piston rod extending from the cylinder cannot pivot relative to the piston. Each cylinder has an associated cross-head bearing mechanism 80. The cross-head bearing mechanism 80 has a cross-head bearing 82 that moves both rotationally and transversely in a slide mechanism 84. The piston rod 66 extends to a cross-head guide wherein the piston rod is pivotally connected to a connecting rod 86. The connecting rod 86 extends from the cross-head bearing 82 to the crankshaft 38. As the piston rod 66 moves in a translational motion up and down in FIG. 3, the connecting rod 86 moves in a combined translational and rotation motion, therein causing the crankshaft 38 to have a pure rotational motion.

Figure 4A:
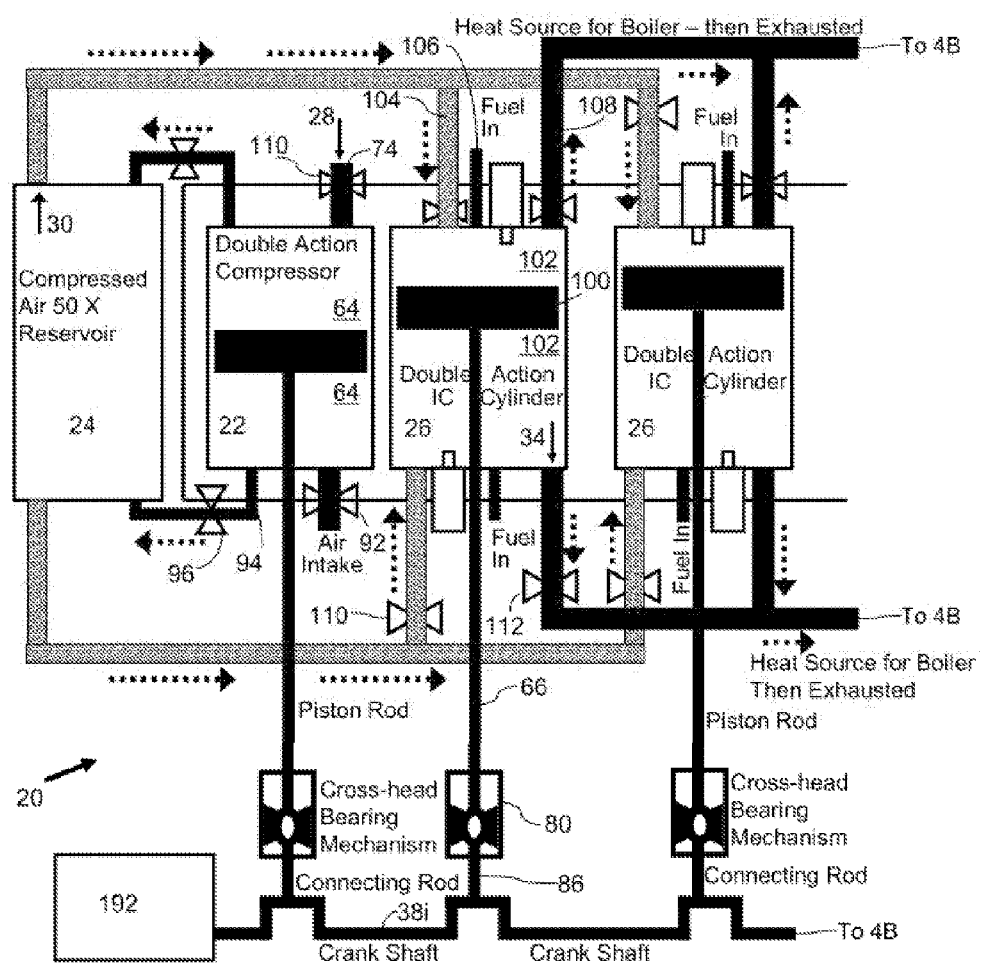
FIGS. 4A & 4B are schematics of the internal combustion engine.
Figure 4B:
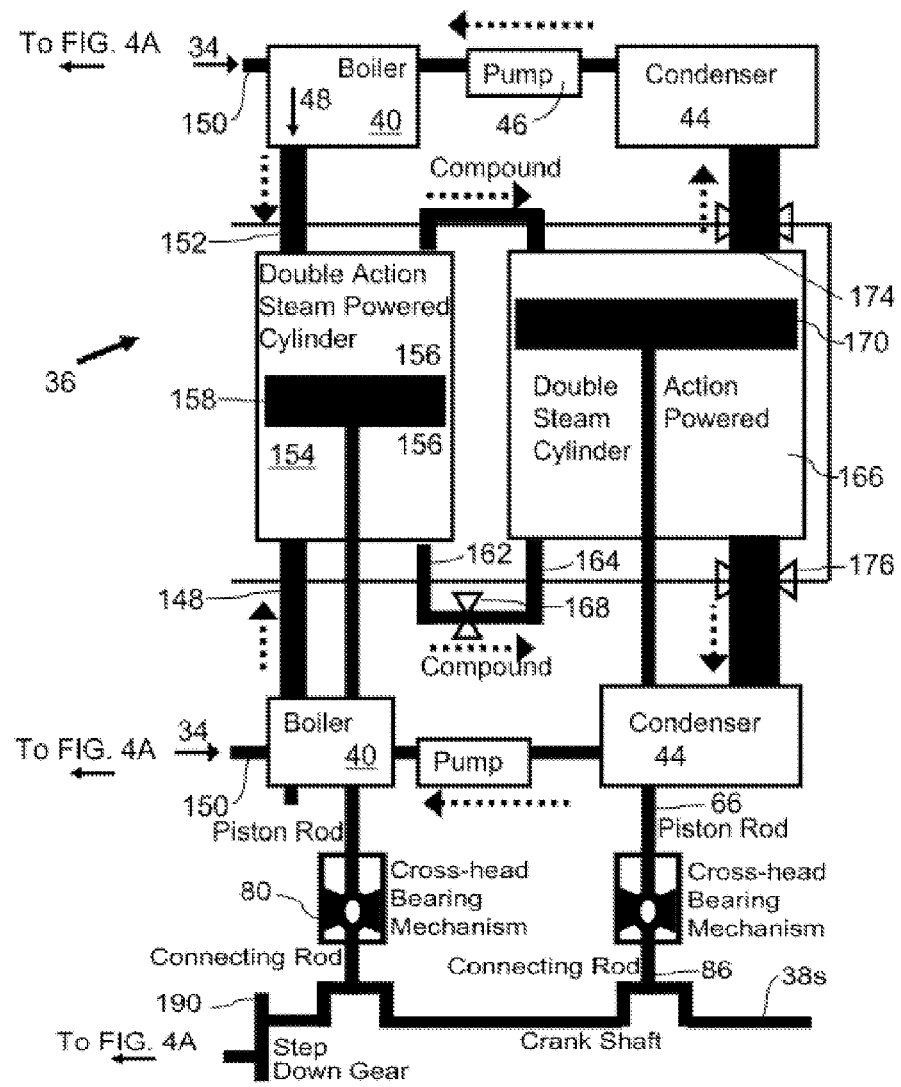

Referring to FIGS. 4A and 4B, a schematic of the internal combustion engine 20 is shown. FIG. 4A shows the double action compressor cylinder 22, a pair of double action combustion cylinders 26, and the compressed air reservoir 24 of the internal combustion engine 20. Air 28 is passed through the intake port 74 into one of the two chambers 64 of the double action compressor cylinder 22. The intake port 74 has a valve mechanism 92 to open and close the intake port 74 allowing air 28 in as the chamber 64 increases in volume and being closed to allow the air 28 to compress into the compressed air 30 as the respective chamber 64 decreases in size. The compressed air 30 is ported through a pipe 94 having a valve mechanism 96 to the compressed air reservoir 24. The compressed air 30 stored in the compressed air reservoir 24 is allowed to move into the double action combustion cylinder 26 when required. Each of the double action combustion cylinders 26 shown in FIG. 4A has a piston 100 which divides the cylinder into two variable size chambers 102. Each double action combustion cylinder 26 has an air intake port 104, a fuel intake port 106, and an exhaust port 108. A valve mechanism 110 is located on each air intake port 104. The ignition of the fuel 32 in the chamber 102 causes expansion and drives the piston 100. The movement of the piston 100 drives the piston rod 66 through the cross-head bearing mechanism 80 to move the respective connecting rod 86 and crankshaft 38.

Still referring to FIG. 4A, the double action compressor cylinder 22 is driven by, rather than driving, the crankshaft 38. Therefore, the connecting rod 86 moves the piston rod 66 through the cross-head bearing mechanism 80. The exhaust 34 from the double action combustion cylinder 26 exits the exit port 108, which has a valve mechanism 112, and is routed to the heat recovery system 36 as shown in FIG. 4B and discussed below.

While the two double action combustion cylinders are shown with both the pistons 100 located towards the upper portion of the page in FIG. 4A, in a preferred embodiment, if there are two power cylinders, the cylinders would be offset by 90 degrees along the crankshaft, so that every 90 degrees one would fire; with two cylinders there are four chambers and with the compression being separate they fire one every revolution. Likewise if there are three cylinders, in a preferred embodiment, the three cylinders would be offset by 60 degrees.

Figure 5:
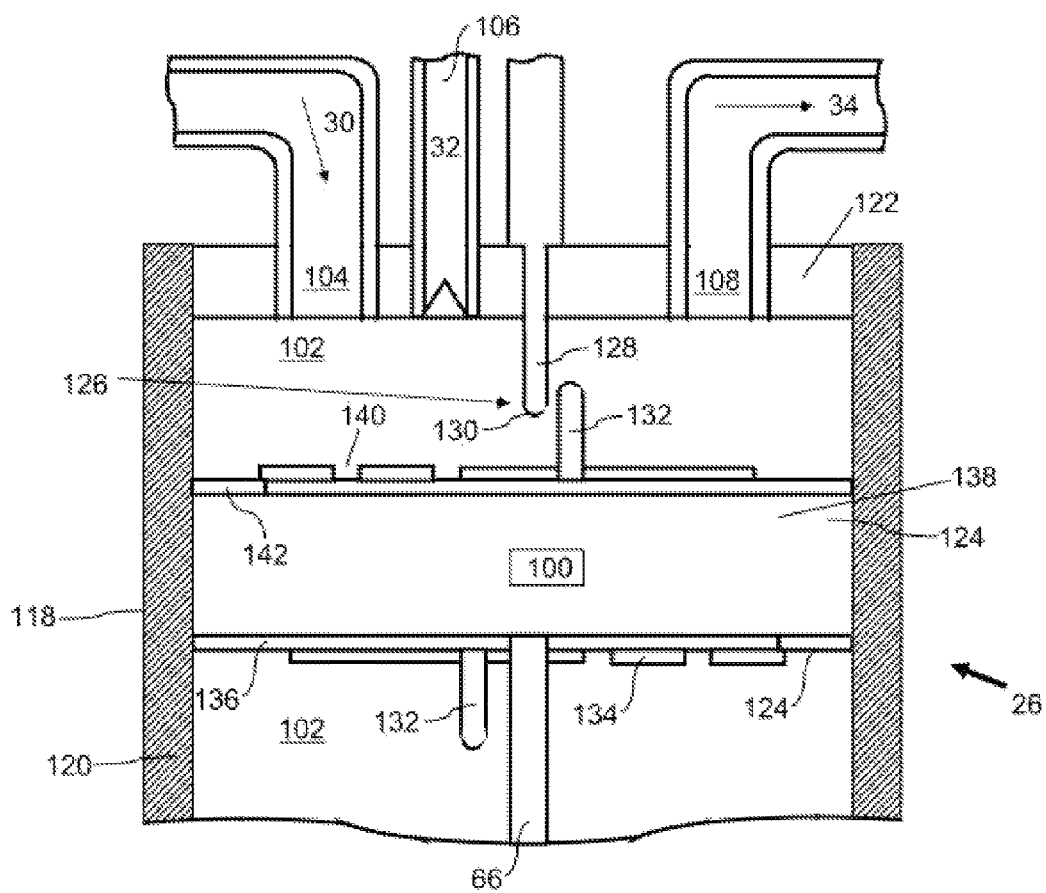
FIG. 5 is a section view of a half of a double action internal combustion cylinder.

Referring to FIG. 5, a section view of half of the double action internal combustion cylinder 26 is shown. The double action combustion cylinder 26 has a cylinder 118 with a wall 120. At each end of the cylinder wall 120 is a cylinder head 122, only one is shown. The double action combustion cylinder 26 has the piston 100 which moves up and down in the cylinder 118 with a pair of piston faces 124. The piston faces 124 define the boundary of the variable size chambers 102. The double action combustion cylinder 26 has a piston rod 66 which extends from the piston 100 through the cylinder head 122, not shown in FIG. 5. The piston rod 66 is connected to the crankshaft 38 as shown in FIG. 4A. The piston rod 66, similar to that shown in FIG. 2, is sealed as it passes through the cylinder head 122 to prevent both compressed air 30 and fuel 32 in the mixture form or the exhaust 34 from passing out of the double action combustion cylinder 26.

Figure 6:
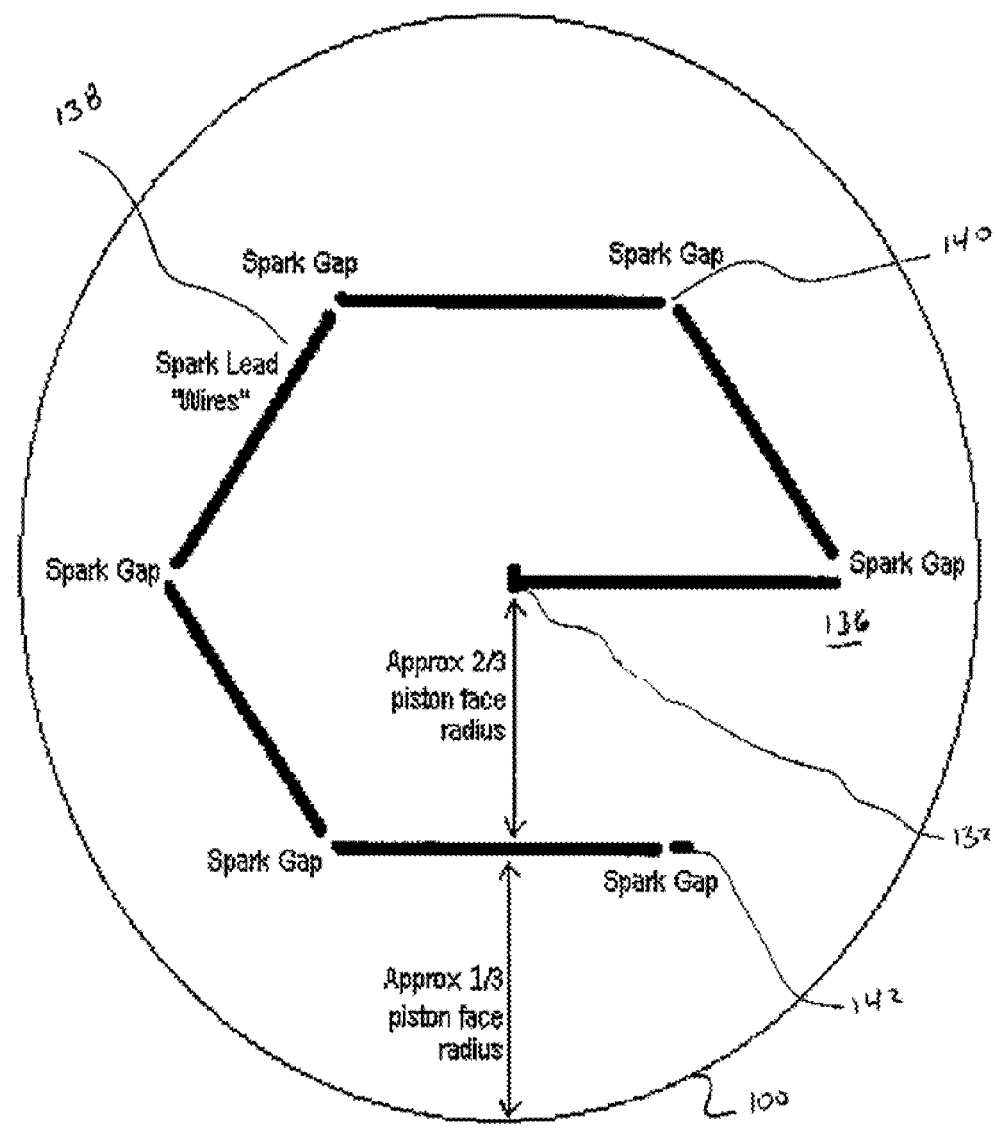
FIG. 6 is top view of a piston face of the piston in the double action internal combustion cylinder.

Still referring to FIG. 5, the air intake port 104, fuel intake port 106, and exhaust port 108 are shown passing through the cylinder head 122. In addition, the double action combustion cylinder 26 has a multi-spark device 126. The multi-spark device 126 has a spark electrode 128 that extends from the cylinder head 122 into the chamber 102. The spark electrode 128 has a post 130 that comes in proximity with a post 132 located on the piston face 124. The post 132 is part of a plurality of electrodes 134 carried on an insulating surface 136, such as a ceramic surface, of the piston face 124. The plurality of electrodes 134, as best seen in FIG. 6, is formed of a plurality of spark lead wires 138 with a plurality of interposed spark gaps 140. The electrodes 134 have a pattern of the series of spark lead wires 138 and interposed spark gaps 140 extending from the post 132 to a piston post 142. The piston post 142 extends through the insulating surface 136 into the metal portion of the piston 100.

As indicated above, the post 130 on the spark electrode 128 does not come into physical contact with the post 132 on the piston face 124, but rather the posts 130 and 132 come into proximity with each other. The gap between the posts 130 and 132 becomes one of the ignition points for the fuel. FIGS. 5 and 6 show the one gap between the posts 130 and 132 and the six surrounding gaps; there would be a total of seven ignition points, arranged in series.

Still referring to FIG. 5, the compressed air 30 is fed into the chamber 102 of the double action combustion cylinder 26 through the air intake port 104 at or near when the piston 100 reaches top dead center, top dead center being when the piston 100 has reached its maximum extension into the chamber, therein maximizing one of the chambers 102 while minimizing the size of the other chamber 102. The location of the piston 100 in FIG. 5 is representative of the top dead center location. With the valve associated with the exit port 108 closed and the compressed air 30 forced into the air intake port 104 into the chamber 102, fuel 32 is injected through the fuel intake port 106.

At top dead center (TDC) the air intake valve would close, followed by the injection of the fuel (so that no fuel aspirates into the air reservoir). The high speed injection of the fuel causes turbulent mixing of fuel and compressed air, followed by the spark ignition within 5-10 degrees after TDC. In that the movement of the piston 100 in the cylinder is related to the rotation of the crank shaft 38 via the rods 66 and 86 and the cross-head bearing mechanism 80, the movement of the cylinder is described in relation to the rotation of the crank shaft 38. Referring to FIG. 4A, the upper top dead center of the piston 100 in the combustion cylinder 26 is 180 degrees from top dead center position of the piston 100 at the other end of the cylinder 26. While most cylinders have only one TDC, in that the cylinders in the embodiment shown are dual action, there are two TDC which are 180 degrees out of phase with each other.

With the compressed air fuel mixture located in the chamber 102, the multi-spark device 126 receives a high voltage to the spark electrode 128, which jumps from the center post 130 to the center post 132 as seen in FIG. 5. The center post 132 located on the piston face 124 is indirectly connected to the piston post 142 through the plurality of electrodes 134 having the spark lead wires 138 and interposed spark gaps 140. The sparks at the various spark gaps 140, as best seen in FIG. 6, ignite the fuel compressed air mixture therein forcing the piston 100 in the downward direction in FIG. 5. At the other end of the cylinder 118 of the dual action combustion cylinder 26 is a similar air intake port 104, fuel intake port 106, and exhaust port 108. In addition, the multi-spark device 126 has a post 130 which interfaces with the spark electrode 128 shown on the other piston face 124 of the piston 100.

In contrast to typical conventional internal combustion engines, the dual action combustion cylinder 26 does not draw air into the chamber 102 by the movement of the piston 100 or compress the air by the movement of the piston 100 in the opposite direction. It is recognized, however, that the movement of the piston 100 will cause air movement; however, it is not the function of the piston 100 to do these two steps of a typical four step cycle. Rather, the double action compressor cylinder 22 and the compressed air reservoir 24 accomplish those features.

The splitting of the typical steps of a four cycle engine from one cylinder to the double action compressor cylinder 22, the compressed air reservoir 24, and the double action combustion cylinder 26, the internal combustion engine has less relative movement of components and therefore less friction. In that friction and the resulting heat is one of the mechanisms that reduces efficiency of an internal combustion engine, the use of one cylinder for compression of the air for all combustion cylinders and using double stroke allows for increased efficiency.

As the piston face 100 reaches the top dead center of the other end of the cylinder 118, the valve associated with the exit port 108 is opened to allow the mixture of exhaust gas 34 to be sent to the heat recovery system 36. Referring to FIG. 4B, the heat recovery system 36 is shown. The exhaust gas 34 travels via a pipe 150 to the boil/heat exchanger 40. The heat from the exhaust gas 34 is transferred to a heat transfer fluid 48. The heated heat transfer fluid 48 is sent via an intake port 152 into the first double action steam power cylinder 154. The pressure of the heat transfer fluid 40 is converted into expanding volume increasing the chamber 156 as the piston 158 moves. As the piston 158 moves, the expanded heat transfer fluid 48 located in the other chamber 156 goes out an exhaust port 162, which is connected to the intake port 164 of the next, the second double, action steam power cylinder 166.

A valve mechanism 168 is interposed between the first double action steam power cylinder 154 and the second double action steam power cylinder 166. The valve mechanism 168 allows the steam to drive the piston 158 and the piston 170 rather than the steam merely moving from cylinder to cylinder without driving the pistons. The second double action steam power cylinder 166 has an exhaust port 174 which is connected to the condenser 44. A valve mechanism 176 is located between the exit port 174 and the condenser 44. The condenser 44 passes the heat exchange fluid 48 which is now in a gaseous form due to its expansion in the two double action steam powered cylinders 154 and 166 back into a liquid state. The heat that is given up in converting the heat transfer fluid 48 back to the liquid state is dumped into the air. The high heat transfer fluid 48 that is a liquid has its pressure increased by the pump 46 prior to going back to the boiler 40. The heat recovery system 36 is a closed system wherein the heat transfer fluid 48 follows a closed loop. The pump 46 can be driven by various methods including driven by the crankshaft 38 or compressed air.

Each of the double action steam powered cylinders 42 has a piston rod 66 that extends from the respective pistons 158 and 170. Each piston rod is connected to a cross-head bearing mechanism 80 and from there to a connecting rod 86. The connecting rods 86 are connected to the crankshaft 38.

While the word "steam" is used, the heat transfer fluid is not limited to water. Steam is being used to include other fluids that are transferred from a gas to a liquid as thermal energy is converted to mechanical energy in the double action steam powered cylinders 42.

In an embodiment, the heat transfer liquid has a boiling temperature at atmospheric pressures in the range of 120° F. to 180° F. such as methanol. In one preferred embodiment, the fluid is methanol. Methanol has a lower heat capacity than water. Therefore less heat energy is required to increase the temperature of a substance with lower specific heat capacity than one with a higher specific heat capacity. In addition, methanol has a lower boiling point than water, that of 148.4° F. (64.7° C.).

Still referring to FIG. 4B, the crankshaft 38 has two portions, a steam portion 38 as in an internal combustion portion 38I. The movement of the respective pistons is different such that the rotational speeds of each portion 38I and 38S is different. The internal combustion engine 20 has a step down gear 190 that takes and coordinates different rotational speeds. In addition, referring back to FIG. 4A, a transmission 192 is shown connected to the crankshaft 38. The transmission 192 drives the item to be driven, typically the wheel of a vehicle.

Figure 7:
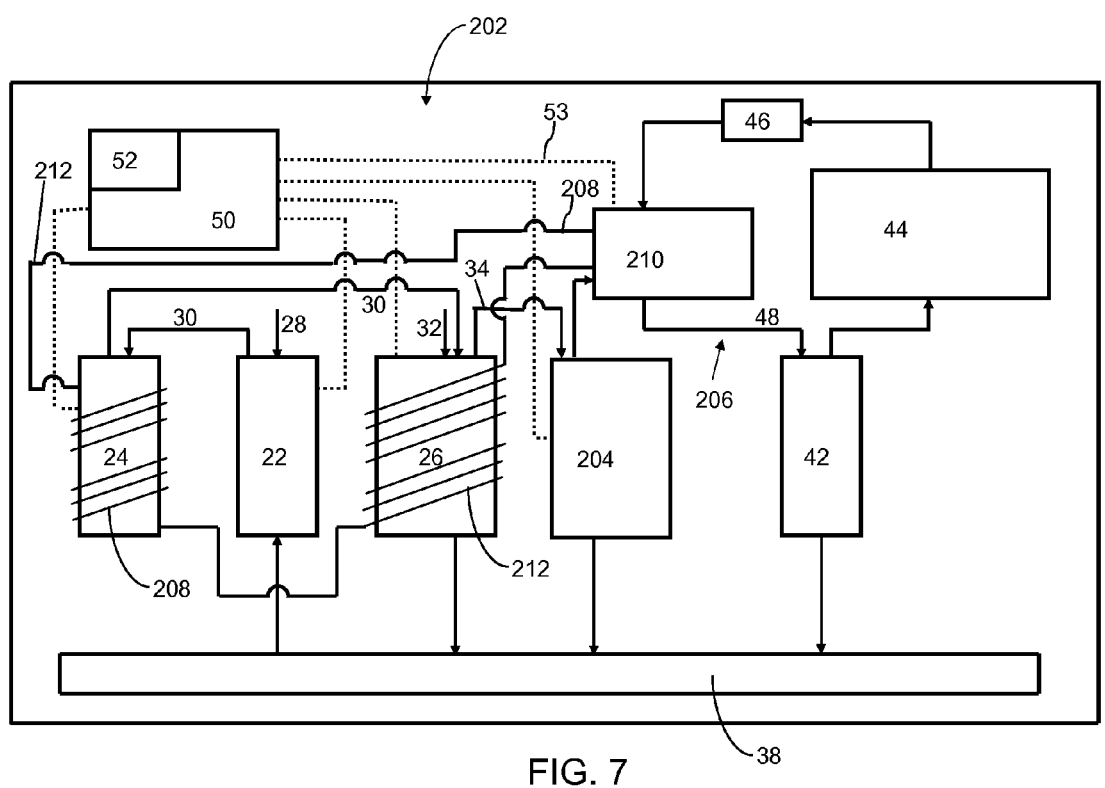
FIG. 7 is a schematic of an alternative embodiment of the internal combustion engine.

Referring to FIG. 7, a schematic of an alternative embodiment of the internal combustion engine 202 is shown. Similar to the internal combustion engine 20 shown in FIGS. 1 and 4A & 4B, the internal combustion engine 202 has a series of components including a double action compression cylinder 22, a compressed air reservoir 24, and a double action internal combustion cylinder 26. Air 28 is taken into the double action compression cylinder 22 and compressed. The compressed air 30 is stored in the compressed air reservoir 24 until needed. The compressed air 30 is mixed with fuel 32 in the double action combustion cylinder 26 and is ignited. In contrast to the previous embodiment, the exhaust 34 from the double action compression cylinder 26 is sent to an expansion cylinder 204 prior to being sent to a heat recovery system 206. The expansion cylinder 204 is dual action as explained in more detail with respect to FIG. 8A.

In a conventional system, the cylinder both compresses the air/fuel mixture initially and then expels the compressed exhaust air after driving the piston away from the top dead center position. In the embodiment shown in FIGS. 7 and 8A, as in the embodiment shown in FIGS. 1 and 4A, the compressed exhaust is at a pressure greater than atmosphere. In the embodiment shown in FIGS. 7 and 8A, the exhaust 34 in the expansion cylinder 204 drives the piston by extracting energy from the compressed exhaust 34.

The motion of the piston in the double action combustion cylinder 26 and the motion of the piston in the expansion cylinder 204 drive a crankshaft 38. The crankshaft 38, in addition to other things, drives the piston in the double action compressor cylinder 22 as explained below in more detail.

Still referring to FIG. 7, the heat recovery system 206 of the internal combustion engine 20 includes a heat exchanger 208, a double action steam-powered cylinder 42, a condenser 44, and a pump 46. The heat exchanger 208, in contrast to the embodiment shown in FIGS. 1 and 4B, not only transfers the heat from the exhaust 34 to a heat transfer fluid 48 as represented by block 210, but also has a piping system 212 that interacts with the combustion cylinder 26 and the compressed air reservoir 24 to extract heat from the combustion cylinder 26 and condition the air in the compressed air reservoir 24 by either heating the air or cooling the air through the cylinder of the compressed air reservoir 24.

Still referring to FIG. 7, similar to the previous embodiment, the heat transfer fluid 48 in the form of a high pressure gas is sent to the double action steam-powered cylinder 42 to drive the piston and thereby drive the crankshaft 38. From the double action steam-powered cylinder 42, the heat transfer fluid 48 is condensed into a liquid in the condenser 44 and pressure is increased by the pump 46, as explained in further detail below.

The internal combustion engine 202 has a control system 50 that controls the operation of the engine 202. The control system 50 has a controller 52, such as a computer or microprocessor that controls the valve systems, the ignition, and monitors temperatures and pressures. It is recognized that the control system 50 could monitor fuel ratios, spark timing, temperatures and compression (pressure), and other properties (elements) of the internal combustion engine 20. The series or hidden lines 53 from the control system 50 represent control lines.

Figure 8A:
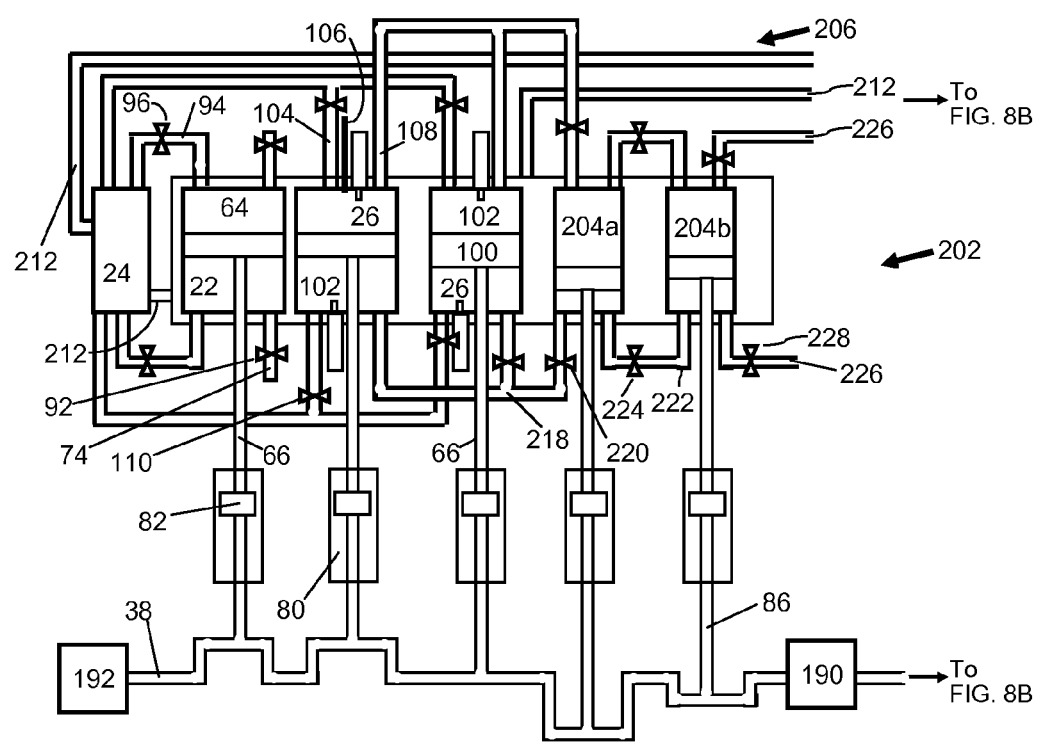
FIGS. 8A & 8B are schematics of the alternative embodiment internal combustion engine of FIG. 7.
Figure 8B:
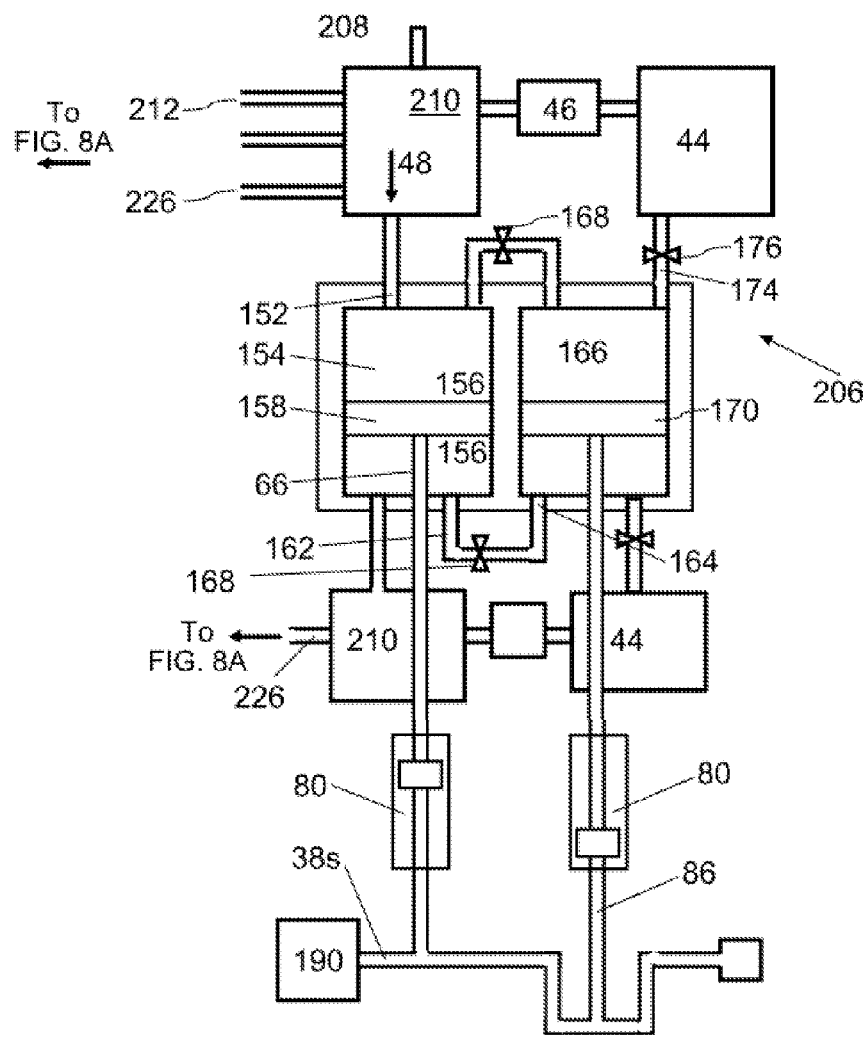

Referring to FIGS. 8A & 8B, a schematic of the internal combustion engine 202 is shown. FIG. 8A shows the double action compressor cylinder 22, a pair of double action combustion cylinders 26, and the compressed air reservoir 24 of the internal combustion engine 20. Air 28 is passed through the intake port 74 into one of the two chambers 64 of the double action compressor cylinder 22. The intake port 74 has a valve mechanism 92 to open and close the intake port 74 allowing air 28 in as the chamber 64 increases in volume and being closed to allow the air 28 to compress into the compressed air 30 as the respective chamber 64 decreases in size. The compressed air 30 is ported through a pipe 94 having a valve mechanism 96 to the compressed air reservoir 24. The compressed air 30 stored in the compressed air reservoir 24 is allowed to move into the double action combustion cylinder 26 when required. Each of the double action combustion cylinders 26 shown in FIG. 8A has a piston 100 which divides the cylinder into two variable size chambers 102. Each double action combustion cylinder 26 has an air intake port 104, a fuel intake port 106, and an exhaust port 108. A valve mechanism 110 is located on each air intake port 104. The ignition of the fuel 32 in the chamber 102 causes expansion and drives the piston 100. The movement of the piston 100 drives the piston rod 66 through the cross-head bearing mechanism 80 to move the respective connecting rod 86 and crankshaft 38.

The internal combustion engine 202 has a pair of expansion cylinders 204. The expansion cylinders 204 are in series with the first expansion cylinder 204a receiving exhaust from the double action combustion cylinders 26 through a pipe 218 having a valve mechanism 220 for controlling the flow. The second expansion cylinder 204b receives exhaust from the first expansion cylinder 204a through a pipe 222 having a valve mechanism 224 for controlling the flow. The exhaust from the second expansion cylinder 204b is fed to the heat recovery system 206 through a pipe 226 having a valve mechanism 228. While energy has been extracted from the pressure in the exhaust, energy from the heat of the exhaust is extracted through the heat recovery system 206 described with the respect to FIG. 8B described below. The heat recovery system 206 includes the piping system 212 that extracts heat from the double action combustion cylinder 26 and conditions the air in the compressed air reservoir 24.

In an embodiment, the double action combustion cylinder 26 can have an exhaust pressure of 60,000 atmosphere pressure. The first expansion cylinder 204a extracts energy to drive the piston through the pressure reduction to 250 atmosphere pressure. The second expansion cylinder 204b extracts energy to drive the piston through the pressure reduction to one atmosphere.

Figure 9:
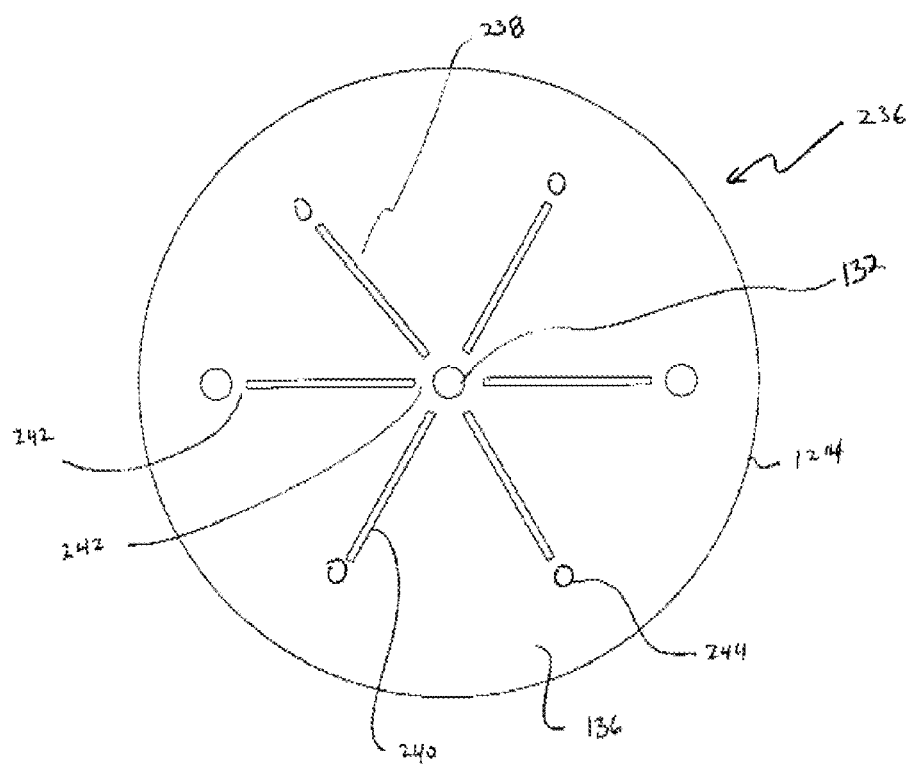
FIG. 9 is top view of a piston face of an alternative piston in the double action internal combustion cylinder.

Referring to FIG. 9, an alternative multi-spark device 236 is shown. The multi-spark device 236 has components carried on the piston face 124 of the double action combustion cylinder 26. The piston face 124 has a post 132 that comes in proximity with a post 130 of the spark electrode 128, as seen in FIG. 5. The post 132 is part of a plurality of electrodes 238 carried on an insulating surface 136, such as a ceramic surface, of the piston face 124. The plurality of electrodes 238, as seen in FIG. 9, in contrast to the previous embodiment, have a plurality of spark lead wires 240 that extend radially outward from the post 132 with an interposed spark gap 242 between the post and the spark lead wires 240. The multi-spark device 236 has a plurality of piston posts 244 that extend through the insulating surface 136 to the piston. An interposed spark gap 242 is located between each respective pair of piston posts 244 and spark lead wires 240.

The gap between the posts 130 and 132 as seen in FIG. 5 becomes one of the ignition points for the fuel. FIG. 9 show twelve surrounding gaps; there would be a total of thirteen ignition points including the gap between the posts 130 and 132.

As indicated above with respect to FIG. 7, the exhaust from the double action combustion cylinder 26 passes through the expansion cylinder 204 prior to being sent to the heat recovery system 206. Referring to FIG. 8B, the heat recovery system 206 is shown. The exhaust gas 34 travels via the pipe 226 to the heat exchanger 208 of the heat recovery system 206. The heat from the exhaust gas 34 is transferred to a heat transfer fluid 48.

The heated heat transfer fluid 48 is sent via an intake port 152 into the first double action steam power cylinder 154. The pressure of the heat transfer fluid 40 is converted into expanding volume increasing the chamber 156 as the piston 158 moves. As the piston 158 moves, the expanded heat transfer fluid 48 located in the other chamber 156 goes out an exhaust port 162, which is connected to the intake port 164 of the next second double action steam power cylinder.

A valve mechanism 168 is interposed between the first double action steam power cylinder 154 and the second double action steam power cylinder 166. The valve mechanism 168 allows the steam to drive the piston 158 and the piston 170 rather than the steam merely moving from cylinder to cylinder without driving the pistons. The second double action steam power cylinder 166 has an exhaust port 174 which is connected to the condenser 44. A valve mechanism 176 is located between the exit port 174 and the condenser 44. The condenser 44 passes the heat exchange fluid 48 which is now in a gaseous form due to its expansion in the two double action steam powered cylinders 154 and 166 back into a liquid state. The heat that is given up in converting the heat transfer fluid 48 back to the liquid state is dumped into the air. The high heat transfer fluid 48 that is a liquid has its pressure increased by the pump 46 prior to going back to the boiler 40. The heat recovery system 36 is a closed system wherein the heat transfer fluid 48 follows a closed loop. The pump 46 can be driven by various methods including driven by the crankshaft 38 or compressed air.

Each of the double action steam powered cylinders 42 has a piston rod 66 that extends from the respective pistons 158 and 170. Each piston rod is connected to a cross-head bearing mechanism 80 and from there to a connecting rod 86. The connecting rods 86 are connected to the crankshaft 38.

Still referring to FIG. 8B, the crankshaft 38 has two portions, a steam portion 38 as in an internal combustion portion 38I. The movement of the respective pistons is different such that the rotational speeds of each portion 38I and 38S is different. The internal combustion engine 20 has a step down gear 190 that takes and coordinates different rotational speeds. In addition, referring back to FIG. 8A, a transmission 192 is shown connected to the crankshaft 38. The transmission 192 drives the item to be driven, typically the wheel of a vehicle.

While the principles of the invention have been described herein, it is to be understood by those skilled in the art that this description is made only by way of example and not as a limitation as to the scope of the invention. Other embodiments are contemplated within the scope of the present invention in addition to the exemplary embodiments shown and described herein. Modifications and substitutions by one of ordinary skill in the art are considered to be within the scope of the present invention.

What is claimed is:

1. An internal combustion engine comprising:
   a compressor cylinder having a cylinder for receiving a piston, the cylinder having a cylinder head and a side wall, an air intake for receiving air, and an exhaust valve on the cylinder head, the piston movable within the cylinder and having a face therein defining a compression chamber, the piston having a rod;
   a compressed air reservoir connected to the compressor cylinder for receiving and storing the compressed air;
   at least two internal combustion cylinders, each internal combustion cylinder having a cylinder for receiving a piston, the cylinder having a cylinder head and a side wall, an air intake for receiving air from the compressed air reservoir, and an exhaust valve on the cylinder head, the piston movable within the cylinder and having a face therein defining a combustion chamber, the piston having a rod;

a crankshaft, the rod of the piston of the internal combustion cylinder connected to the crankshaft and rotating the shaft, the rod of the piston from the compressor cylinder connected to the shaft and driven by the rotation of the shaft;

a fuel injection mechanism for injecting fuel into the combustion chamber; and an ignition system for igniting a mixture of compressed air and fuel in the combustion chamber to drive the piston;

wherein the air is compressed prior to being injected into the combustion chamber therein allowing a sole compression cylinder to provide compressed air to at least two internal combustion cylinders therefore reducing frictional energy loss.

2. An internal combustion engine of claim 1 wherein the compressor cylinder and the at least two combustion cylinders are each double action with the cylinder having a pair of cylinder heads and a side wall, the piston movable within the cylinder and having a pair of faces therein defining a pair of chambers in each cylinder, the piston having a rod that extends through one of the cylinder heads of the cylinder.

3. An internal combustion engine of claim 2 further comprising a closed heat recovery system including:

a heat exchanger for taking heat of the exhaust from the at least one internal combustion cylinder and transferring a portion of the heat to a heat transfer fluid;

a first double action power cylinder having a cylinder for receiving a piston, the cylinder having a pair of cylinder heads and a side wall, the piston movable within the cylinder and having a pair of faces therein defining a pair of chambers, driving the piston by the expansion of the heat transfer fluid in one of the chambers, the piston connected to a rod that extends out of the cylinder;

a second double action power cylinder having a cylinder for receiving a piston, the cylinder having a pair of cylinder heads and a side wall, the piston movable within the cylinder and having a pair of faces therein defining a pair of chambers, driving the piston by the expansion of the heat transfer fluid in one of the chambers, the piston connected to a rod that extends out of the cylinder;

a condenser connected to the exhaust of the second double action power cylinder for converting the heat transfer fluid into a liquid; and a pump for receiving the output of the condenser and for pumping the heat transfer fluid to the heat exchanger and increasing the pressure of the heat transfer liquid; and a heat recovery power crankshaft, the rod of the piston from each of the double action power cylinders connected to the heat recovery power crankshaft and rotating the heat recovery power crankshaft; and a step down gear connected to the heat recovery power crankshaft for delivering power to the crankshaft.

4. An internal combustion engine of claim 3 wherein the heat transfer liquid is methanol.

5. An internal combustion engine of claim 4 wherein the pressure of the exhaust from the double action combustion cylinder is greater than 50,000 atmospheres.

6. An internal combustion engine of claim 2 wherein the cylinder head through which the rod extends has an opening with a plurality of grooves;

the internal combustion engine further comprises:

a plurality of clamp rings carried in the grooves on the cylinder head for sealing the opening while allowing motion of the rod relative to the cylinder head; and a cross head bearing mechanism for converting lateral motion of the piston rod to translational motion of the crankshaft.

7. An internal combustion engine of claim 1 wherein the ignition system comprises a multiple spark device associated with each of the cylinder heads of the internal combustion cylinder, each multiple spark device having a post extending from the cylinder head, a post extending from the face of the piston, and a plurality of electrodes defined by a plurality of lead wires and intervening gaps carried on a face of an insulated surface on the face of the piston, wherein multiple sparks are formed between adjacent lead wires and between the posts when the piston is in proximity to the respective cylinder head.

8. An internal combustion engine of claim 1 further comprising:

an expansion cylinder having a cylinder for receiving a piston, the cylinder having a cylinder head and side wall, the cylinder having an intake for receiving exhaust from the at least two internal combustion cylinders and output for exporting exhaust to the heat exchanger, the piston movable within the cylinder and having a face therein defining a expansion chamber, the piston driven by the expansion of the exhaust in the cylinder, the piston having a rod that extends out of the cylinder for driving the crank shaft.

9. An internal combustion engine comprising:

a double action internal combustion cylinder having an internal combustion cylinder for receiving a piston, the cylinder having a pair of cylinder heads and a side wall, an air intake for receiving air, and an exhaust valve on each cylinder head, the piston movable within the cylinder and having a pair of faces therein defining a pair of combustion chambers, the piston having a rod that extends through one of the cylinder heads of the cylinder;

a fuel injection mechanism for injecting fuel into each of the combustion chambers;

an ignition system for igniting a mixture of compressed air and fuel in the combustion chamber to drive the piston;

a crankshaft; and a cross head bearing mechanism for converting lateral motion of the piston rod to translational motion of the crankshaft, the rod of the piston from the cylinder connected to the shaft and rotating the shaft.

10. An internal combustion engine of claim 9 further comprising a multiple spark device associated with each of the cylinder heads of the internal combustion cylinder, each multiple spark device having a post extending from the cylinder head, a post extending from the face of the piston, and a plurality of electrodes defined by a plurality of lead wires and intervening gaps carried on a face of an insulated surface on the face of the piston, wherein multiple sparks are formed between adjacent lead wires and between the posts when the piston is in proximity to the respective cylinder head.

11. An internal combustion engine of claim 10 further comprising:

a compressor cylinder having a cylinder for receiving a piston, the cylinder having a pair of cylinder heads and a side wall, an air intake for receiving air and an exhaust valve on the cylinder head, the piston movable within the cylinder and having a face therein defining a pair of compression chambers, the piston having a rod;

a compressed air reservoir connected to the compressor cylinder for receiving and storing the compressed air;

wherein the double action internal combustion cylinder is at least two double action internal combustion cylinders, each internal combustion cylinder having a cylinder for receiving a piston, the cylinder having a pair of cylinder heads and a side wall, an air intake for receiving air from the compressed air reservoir and an exhaust valve on each of the cylinder heads, the piston movable within the cylinder and having a pair of faces therein defining a pair of combustion chambers, each piston having a rod.

12. An internal combustion engine of claim 11 further comprising a closed heat recovery system including a heat exchanger for taking heat of the exhaust from the at least one internal combustion cylinder and transferring a portion of the heat to a heat transfer fluid;

a first double action power cylinder having a cylinder for receiving a piston, the cylinder having a pair of cylinder heads and a side wall, the piston movable within the cylinder and having a pair of faces therein defining a pair of chambers, driving the piston by the expansion of the heat transfer fluid in one of the chambers, the piston connected to a rod that extends out of the cylinder;

a second double action power cylinder having a cylinder for receiving a piston, the cylinder having a pair of cylinder heads and a side wall, the piston movable within the cylinder and having a pair of faces therein defining a pair of chambers, driving the piston by the expansion of the heat transfer fluid in one of the chambers, the piston connected to a rod that extends out of the cylinder;

a condenser connected to the exhaust of the second double action power cylinder for converting the heat transfer fluid into a liquid; and a pump for receiving the output of the condenser and for pumping the heat transfer fluid to the heat exchanger and increasing the pressure of the heat transfer liquid; and a heat recovery power crankshaft, the rod of the piston from each of the double action power cylinders connected to the heat recovery power crankshaft and rotating the heat recovery power crankshaft.

13. An internal combustion engine of claim 12 further comprising a step down gear connected to the heat recovery power crankshaft for delivering power to the crankshaft.

14. An internal combustion engine of claim 13 wherein the heat transfer liquid has a boiling temperature at atmospheric pressures in the range of 120° F. to 180° F.

15. An internal combustion engine of claim 14 wherein the heat transfer liquid is methanol.

16. An internal combustion engine of claim 12 wherein the heat exchanger includes piping for interacting with the internal combustion cylinder and the compressed air reservoir for extracting heat from the internal combustion cylinder and conditioning the compressed air in the compressed air reservoir.

17. An internal combustion engine of claim 9 further comprising:

at least a pair of double action expansion cylinders, each cylinder having a cylinder for receiving a piston, each of the cylinders having a pair of cylinder heads and a side wall, the piston movable within the cylinder and having a pair of faces therein defining a pair of chambers, the first double action expansion cylinder has a pair of intakes for receiving exhaust from the at least two internal combustion cylinders and a pair of outputs for exporting exhaust to the second double action cylinder, the piston driven by the expansion of the exhaust in the cylinder, the piston having a rod that extends out of the cylinder for driving the crank shaft; and the second double action expansion cylinder has a pair of intakes for receiving exhaust from the first double action expansion cylinder and a pair of outputs for exporting exhaust to the heat exchanger, the piston driven by the expansion of the exhaust in the cylinder, the piston having a rod that extends out of the cylinder for driving the crank shaft.

18. An internal combustion engine comprising:

a double action compressor cylinder having a cylinder for receiving a piston, the cylinder having a pair of cylinder heads and a side wall, an air intake for receiving air, and an exhaust valve on each of the cylinder heads, the piston movable within the cylinder and having a pair of faces therein defining a pair of compression chambers, the piston having a rod that extends through one of the cylinder heads of the double action compressor cylinder;

a compressed air reservoir connected to the compressor cylinder for receiving and storing the compressed air;

at least two double action internal combustion cylinders, each internal combustion cylinder having a cylinder for receiving a piston, the cylinder having a pair of cylinder heads and a side wall, an air intake for receiving air from the compressed air reservoir, and an exhaust valve on each of the cylinder heads, the piston movable within the cylinder and having a pair of faces therein defining a pair of combustion chambers, the piston having a rod that extends through one of the cylinder heads of the double action internal combustion cylinder;

at least a pair of double action expansion cylinders, each cylinder having a cylinder for receiving a piston, each of the cylinders having a pair of cylinder heads and a side wall, the piston movable within the cylinder and having a pair of faces therein defining a pair of chambers, the first double action expansion cylinder has a pair of intakes for receiving exhaust from the at least two internal combustion cylinders and a pair of outputs for exporting exhaust to the second double action cylinder, the piston driven by the expansion of the exhaust in the cylinder, the piston having a rod that extends out of the cylinder for driving the crank shaft; and the second double action expansion cylinder has a pair of intakes for receiving exhaust from the first double action expansion cylinder and a pair of outputs for exporting exhaust to a heat exchanger, the piston driven by the expansion of the exhaust in the cylinder, the piston having a rod that extends out of the cylinder for driving the crank shaft;

a crankshaft, the rod of the piston of the internal combustion cylinder connected to the crankshaft and rotating the shaft;

the rod of the piston from each of the expansion cylinders is connected to the crankshaft and drives the crankshaft;

the rod of the piston from the compressor cylinder connected to the shaft and driven by the rotation of the shaft;

a cross head bearing mechanism for converting lateral motion of the piston rod to translational motion of the crankshaft;

a fuel injection mechanism for injecting fuel into the combustion chamber;

an ignition system for igniting a mixture of compressed air and fuel in the combustion chamber to drive the piston; and a closed heat recovery system including:

a heat exchanger for taking heat of the exhaust from the at least one internal combustion cylinder and transferring a portion of the heat to a heat transfer fluid, the heat exchanger including piping for interacting with the internal combustion cylinder and the compressed air reservoir for extracting heat from the internal combustion cylinder and conditioning the compressed air in the compressed air reservoir;

a first double action power cylinder having a cylinder for receiving a piston, the cylinder having a pair of cylinder heads and a side wall, the piston movable within the cylinder and having a pair of faces therein defining a pair of chambers, driving the piston by the expansion of the heat transfer fluid in one of the chambers, the piston connected to a rod that extends out of the cylinder;

a second double action power cylinder having a cylinder for receiving a piston, the cylinder having a pair of cylinder heads and a side wall, the piston movable within the cylinder and having a pair of faces therein defining a pair of chambers, driving the piston by the expansion of the heat transfer fluid in one of the chambers, the piston connected to a rod that extends out of the cylinder;

a condenser connected to the exhaust of the second double action power cylinder for converting the heat transfer fluid into a liquid;

a pump for receiving the output of the condenser and for pumping the heat transfer fluid to the heat exchanger and increasing the pressure of the heat transfer liquid;

a heat recovery power crankshaft, the rod of the piston from each of the double action power cylinders connected to the heat recovery power crankshaft and rotating the heat recovery power crankshaft; and a step down gear connected to the heat recovery power crankshaft for delivering power to the crankshaft;

wherein the air is compressed prior to being injected into the combustion chamber therein allowing a sole compression cylinder to provide compressed air to at least two internal combustion cylinders therefore reducing frictional energy loss.

19. An internal combustion engine of claim 18 wherein the heat transfer liquid has a boiling temperature at atmospheric pressures in the range of 120° F. to 180° F.

20. An internal combustion engine of claim 18 wherein the ignition system comprises a multiple spark device associated with each of the cylinder heads of the internal combustion cylinder, each multiple spark device having a post extending from the cylinder head, a post extending from the face of the piston, and a plurality of electrodes defined by a plurality of lead wires and intervening gaps carried on a face of an insulated surface on the face of the piston, wherein multiple sparks are formed between adjacent lead wires and between the posts when the piston is in proximity to the respective cylinder head.

* * * * *